United States Patent [19]

Ito

[11] 4,313,528
[45] Feb. 2, 1982

[54] WATER PREVENTING STRUCTURE IN A DRUM-IN-DISC BRAKE

[75] Inventor: Sadayoshi Ito, Toyota, Japan

[73] Assignee: Toyota Jidosha Kogyo Kabushiki Kaisha, Toyota, Japan

[21] Appl. No.: 122,703

[22] Filed: Feb. 19, 1980

[30] Foreign Application Priority Data

Feb. 27, 1979 [JP] Japan .................. 54-24805[U]

[51] Int. Cl.³ ............................................ F16D 65/04
[52] U.S. Cl. ............................................. 188/218 A
[58] Field of Search ............... 188/218 A, 71.1, 70 R

[56] References Cited

U.S. PATENT DOCUMENTS

| 3,827,534 | 8/1974 | Brooks | 188/71.1 |
| 3,850,266 | 11/1974 | Hesskamp et al. | 188/70 R |
| 4,005,768 | 2/1977 | Bubnash et al. | 188/218 A |

Primary Examiner—Bernard Nozick
Attorney, Agent, or Firm—Stevens, Davis, Miller & Mosher

[57] ABSTRACT

A water preventing structure of a drum-in-disc brake having a brake drum and a disc rotor extending from the outer periphery thereof. A friction surface of the disc rotor and an opening of the brake drum are respectively covered by a dust cover and a backing plate. A water carrying plate is attached to the inside surface of the dust cover for forming an upwardly open water carrying groove in co-operation with the latter. The inside surface of the inner brim of the dust cover is fixed to the outside surface of the outer brim of the backing plate, leaving a part thereof separated therefrom for forming a drainage passage at a place right beneath the water carrying plate.

8 Claims, 8 Drawing Figures

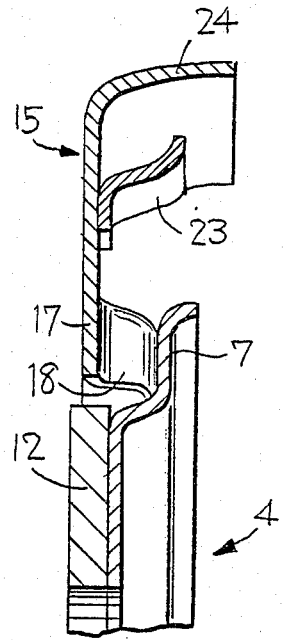
FIG. 5
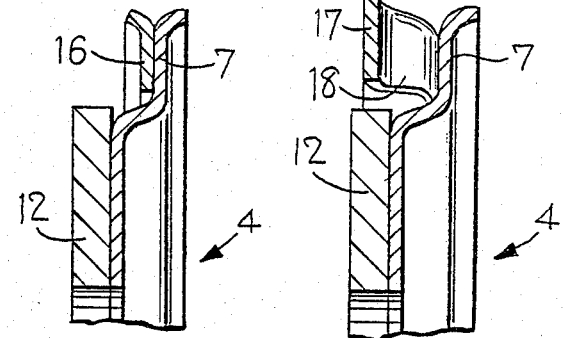
FIG. 6   FIG. 7
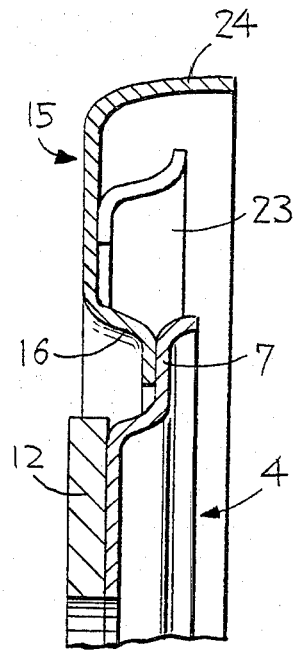
FIG. 8
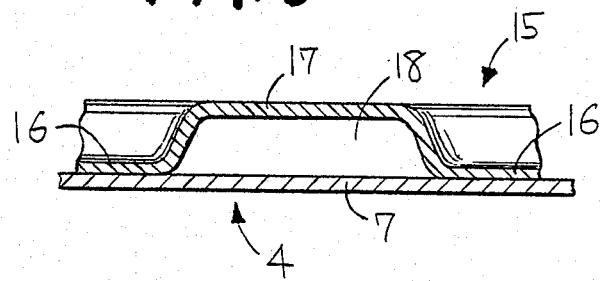

WATER PREVENTING STRUCTURE IN A DRUM-IN-DISC BRAKE

FIELD OF THE INVENTION

This invention relates to a structure, in a drum-in-disc brake, for preventing ingress of water or mud-water into the brake drum.

BACKGROUND OF THE INVENTION

In a case of water ingress, in a drum brake, into a brake drum, or attaching (sticking) of water and mud-water (hereinafter simply called water), in a disc brake, onto a disc rotor, there is a likelihood of taking place shortage of braking effect due to a decrease of frictional coefficient between a brake drum and a brake shoe or between a disc rotor and a brake pad. In some other cases rusting occurring around the wet portions may shorten life of the brake system, or grains of the mud may disadvantageously damage the frictional surfaces. This unfavorable phenomenon also takes place in a drum-in-disc brake which contains both the drum brake portion and the disc brake portion. There have conventionally been proposed some preventing measures, for example, disposing one or another labyrinth (complicated water passage) by means of applying some device or design on the backing plate, dust cover and brake drum, disposing a simple water guard or gutter, etc. All of those have not been satisfactory in the water preventing effect. In addition, the inner brim portion of the dust cover which covers the disc rotor is generally bent inwardly (in the direction approaching the opening portion of the brake drum) for being secured on the outer brim portion of the backing plate which is fixedly disposed in confrontation to the opening portion of the brake drum, and this bent brim portion is likely to introduce water against expectation into the drum brake, to the great disadvantage.

SUMMARY OF THE INVENTION

This invention was made, considering such a background as mentioned above, with a primary object of providing a structure capable of preventing the water, even when large amount of water comes in a drum-in-disc brake, from attaching onto the disc rotor or coming into the brake drum.

Another object of this invention is to provide the structure in the simplest form and at the lowest cost.

The essential points of this invention can be summarized as follows: (a) on the outside surface of an outer brim portion, of a circular shaped backing plate fixed in confrontation to the opening portion of a brake drum, the inside surface of an inner brim portion, of a dust cover of annular or arcuate shape for covering a disc rotor is firmly fixed (secured); (b) an upwardly opened water passage groove is formed between the inside surface of the dust cover and a water carrying plate attached to the inside surface of the dust cover in such a manner that an inner brim portion of the water carrying plate is secured to the dust cover and an outer brim portion thereof is confronted with a small gap to a frictional surface of a disc rotor; and (c) a part of the inside surface of the inner brim portion of the dust cover is separated, at a place beneath the water carrying plate, from the outside surface of the outer brim portion of the backing plate for forming a passage for drainage.

By having such a structure in a drum-in-disc brake, water can be effectively prevented, even when it is large in amount, from attaching to the disc rotor or coming into the brake drum. This largely eliminates the degradation of the braking effect either in the drum brake portion or the disc brake portion due to the ingress of water, with a favorable result of elongating the life of the brake. Besides, the invented structure is also effective in preventing ingress of mud grains contained in the mud-water which are liable to damage the frictional surfaces in the brake.

BRIEF DESCRIPTION OF THE DRAWINGS

FIG. 5 is a cross-sectional view taken along line V of FIG. 2;

FIG. 6 is a cross-sectional view taken along line VI of FIG. 2;

FIG. 7 is a cross-sectional view taken along line VII of FIG. 2, and;

FIG. 8 is a cross-sectional view taken along line VIII FIG. 2.

DETAILED DESCRIPTION OF THE PREFERRED EMBODIMENTS

Figure 1:
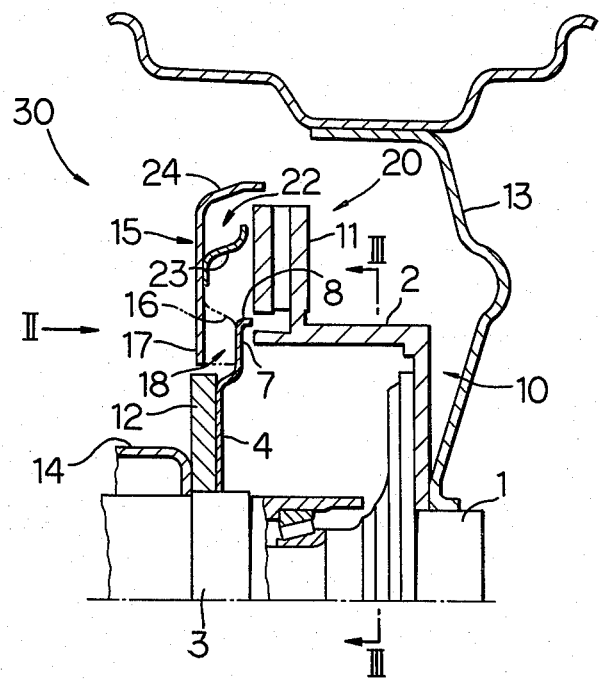
FIG. 1 is an axial sectional view of an embodiment of drum-in-disc brake according to the invention.

With reference to the appended drawings detailed description of the preferred embodiments will be made hereunder.

A drum-in-disc brake 30 is composed of a drum brake portion 10 and a disc brake portion 20. The drum brake portion 10 includes a brake drum 2 which is of cylindrical form with a bottom and rotates with an axle shaft 1, a backing plate 4 which is of plate form with an opening and secured to a caliper retainer 12 made into an integrated body with a suspension arm 14, a pair of brake shoes 5 retained by the backing plate 4 for being slidably abutted on the inner surface of the brake drum 2, and a parking brake mechanism which comprises an anchor 31, a link member 32, a lever 33, a strut 34, a wire 35, etc. The disc brake portion 20 includes, on the other hand, a disc rotor 11 disposed on the outer periphery of the brake drum 2, a caliper assembly 36 straddling the disc rotor 11 and retained by the caliper retainer 12 for movably carrying a pair of brake pad assemblies 37 and a piston 38, etc. Numeral 3 designates an axle housing and numeral 13 does a wheel disc.

Figure 2:
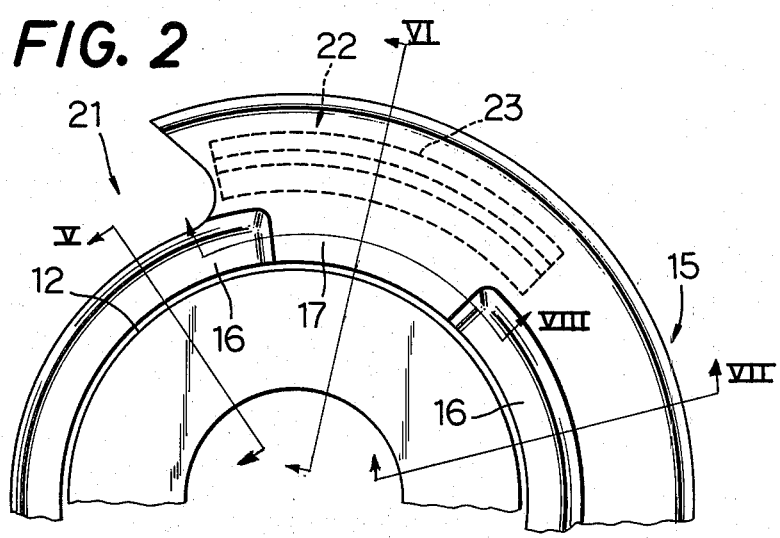
FIG. 2 is a side view of the dust cover and water preventing structure seen from the direction marked with II.
Figure 3:
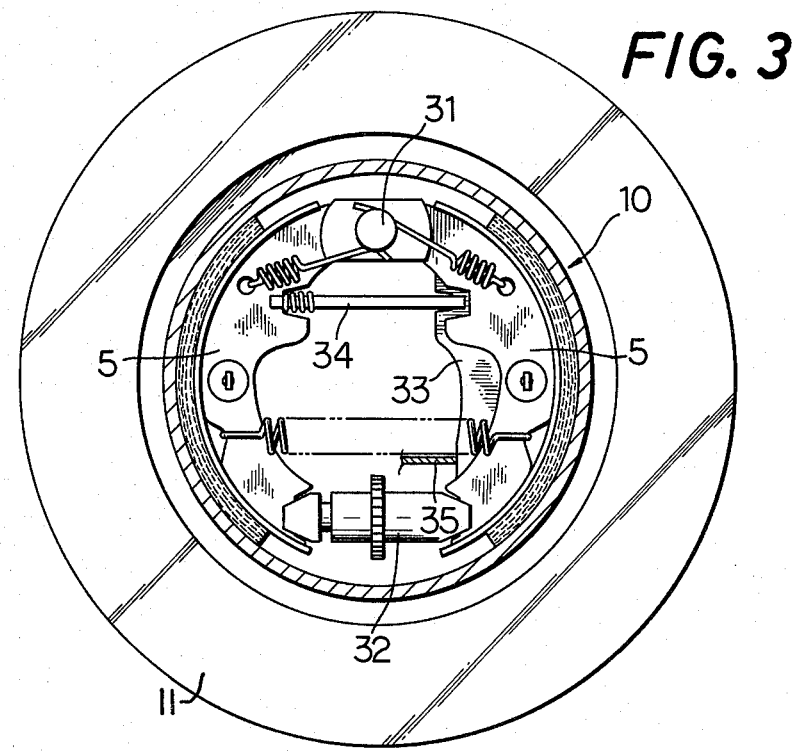
FIG. 3 is a cross sectional view taken along the line III—III of FIG. 1.
Figure 4:
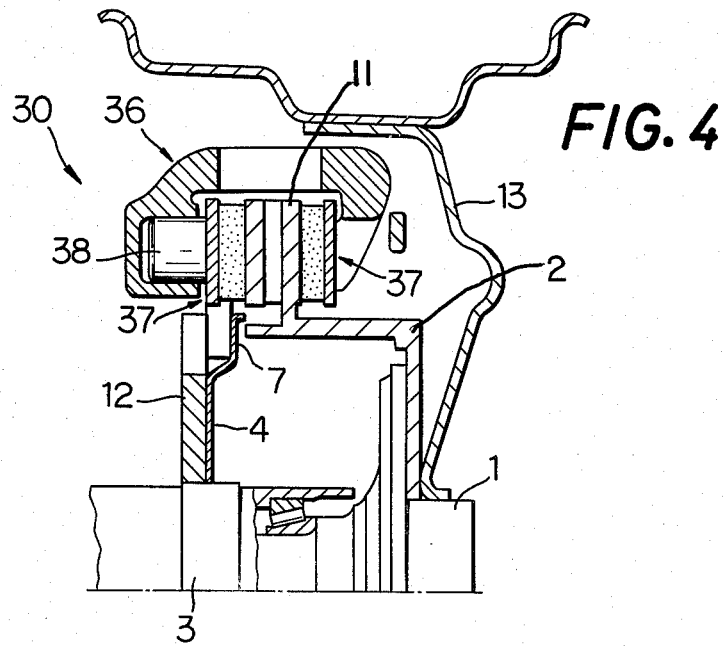
FIG. 4 is another axial sectional view of the brake shown in FIG. 1.

On the outer side (more alienated position from the axle shaft 1) of the backing plate 4 an annular shaped dust cover 15 is disposed, which is provided with an outer brim 24 and an inner brim 16 shown with a two-dot-chain line in FIG. 1, both being inwardly bent, as shown in FIG. 1 bent in a direction approaching to the backing plate 4, but is partially not bent as can be seen in FIG. 2 at a position above the axle shaft 1 within the sphere of approximately 45° circumferential angle. The iwardly faced surface of the inner brim 16 of the dust cover 15 and the outwardly faced surface of an outer brim 7 of the backing plate 4 are firmly fixed with each other by means of any conventional process like a spot welding, ranging around the whole circumferential area excluding the not-bent portion 17 of the inner brim 16 of the dust cover 15. This not-bent portion 17, provides a place where the dust cover 15 is not contacted with the backing plate 4, consequently makes a downward passage 18, as seen in FIG. 2, which functions as a drain or water exhausting passage. The edge of the not-bent portion 17 is confronted with a purposefully left gap to the periphery of the caliper retainer 12 for forming an exit narrower than and perpendicular to the passage 18. Besides, the backing plate 4 is, at the outermost portion 8 thereof, bent toward the brake drum 2 to cover the outer periphery thereof in the neighborhood of the opening of the brake drum 2.

The dust cover 15 has a cutaway portion 21 at the outer portion thereof, as can be seen in FIG. 2, for allowing the caliper assembly to be accommodated thereinto, and further has a water passage groove 22 right above the opening 18 for drainage. The groove 22 is formed by attaching concentrically with the disc rotor 11 a water carrying plate 23 of arcuate shape which has a gently bent S-letter section. The inner brim of the water carrying plate 23 is secured to the inside surface of the dust cover 15 such that the outer brim thereof confronting with a small gap to the friction surface of the disc rotor 11. In other words the upwardly opened water passage groove 22 is formed between the dust cover 15 and the water carrying plate 23 attached to the former. In this embodiment the water carrying plate 23 has such a length that two lines linking either end of the plate 23 to the axial center of the dust cover 15 form approximately 70°, and is so positioned as a part covering about 20° out of the 70° is forward (left side in FIG. 2) of the vertical line passing the axial center of the dust cover 15 and the rest covering the remaining 50° is rearward of the vertical line. The earlier stated outer brim 24 of the dust cover 15 is also inwardly bent, just like in the case of the backing plate 4, for covering the disc rotor 11.

Due to such a structure and positioning of the backing plate 4, the dust cover 15, and the water carrying plate 23, the water ingress into between the dust cover 15 and the disc rotor 11 can be, when the water is small in amount, caught by the water carrying plate 23 to prevent the same from being attached to the disc rotor 11, and led through the water passage groove 22 as far as a favorable place avoiding the essential position right above the axial center of the brake drum 2 for being dropped from either end of the water passage groove 22. The water exhausting from the lower gap between the dust cover 15 and the disc rotor 11 will save the drum brake portion 10 from being wetted.

Even when the water is large in amount to overflow the water passage groove 22, the water overflowed the water carrying plate 23 can be guided, as it comes down, by the outer brim of the backing plate 4 toward the passage 18 for drainage. It effectively prevents the water from coming into the brake drum 2.

The disposition of the water passage groove 22 and the passage 18 for drainage can effectively prevent the water, which comes down over the top of the dust cover 15, from attaching to the disc rotor 11 and coming inside the brake drum 2, irrespective of the inside positioning of the brake drum 2 than the disc rotor 11 in the drum-in-disc brake 30 containing two parts of the drum brake portion 10 and the disc brake portion 20. This effectively and conspicuously eliminates the conventional disadvantages, or demerits, of the prior art such as degrading of the braking effect, in the drum brake portion 10 and the disc brake portion 20, by the ingress of water, shortening of the life of the braking system due to an occurrence of rusting, mechanical damage of the frictional surfaces of the disc rotor 11 and the brake drum 2 due to the mud grains, etc.

The already stated disposition of the passage 18 for drainage is very advantageous for its functioning as a vent, an opening for the air circulation, so that the disc rotor 11 may be favorably cooled. This merit is particularly remarkable in a ventilated type disc brake as in this embodiment. A small gap left between the top of the caliper retainer 12 and the lower end of the dust cover 15 hardly allows ingress of water. Even when a trifling amount of water might comes into this place it would be suspended by the backing plate 4 from coming into the brake drum 2. The shaping of the water carrying plate 23 into a gentle S-letter form in section thereof is aimed at a sure receiving water, when it is large in amount, by leading the water to the side of the dust cover 15, and letting the water flow down along the inner side of the dust cover 15 where the possibility of flowing the water into the brake drum 2 is presumed to be much less. The gap between the caliper retainer 12 and the dust cover 15 as well as the gap between the water carrying plate 23 and the disc rotor 11 are both desirable to be as small as possible.

The above-mentioned embodiment and the description therefor are only by way of example, not for being interpreted at all to limit the invention. Many modifications and variations are available without departing from the spirit and sphere of the invention for those skilled in the art.

For example, the water carrying plate may be much longer, if the circumstances thereround allow, such that the circumferential angle formed between the two lines linking either end of the water carrying plate to the axial center of the dust cover is as large as 180°, i.e., angle covering the upper semi-circular area. And any ingenious combination of the variable length of the water carrying plate and likewise variable shape of the same in its cross-section may be effective in guiding the water in a harmless way. As to the passage for drainage too, an effective device is thought of, for example, the water receiving side thereof may be much larger and the opening on the water exhausting side can be narrowed down for making the water exhaustion and prevention of counter ingress of water from this opening easier.

What is claimed is:

1. A drum-in-disc brake comprising:
   a cylindrical brake drum;
   a disc rotor extending from the outer periphery of said brake drum, said disc rotor comprising in part a friction surface;
   a caliper assembly mounted adjacent said disc rotor;
   an annular backing plate covering one end of said brake drum, an outer brim extending from said backing plate's outer periphery, and;
   a dust cover comprising an inside surface which faces said brake drum and said rotor, said inside surface having an annular inner brim, said inner brim being firmly attached to said outer brim extending from said backing plate, said annular inner brim being gapped to allow for water drainage, a water carrying plate extending from said inside surface of said dust cover towards said friction surface of the rotor, and an upwardly open water groove formed between said inner surface of said dust cover and said water carrying plate.

2. A drum-in-disc brake claimed in claim 1, wherein said dust cover is of annular shape and is provided with a cutaway portion at the outer portion thereof for allowing said caliper assembly to be accommodated thereinto.

3. A drum-in-disc brake claimed in claim 1, wherein said backing plate is, at the outermost portion, bent toward said brake drum to cover the outer periphery thereof in the neighborhood of the opening of said brake drum.

4. A drum-in-disc brake claimed in claim 1, wherein said water carrying plate is of arcuate shape and concentrically disposed with said disc rotor.

5. A drum-in-disc brake claimed in claim 1, wherein said water carrying plate in cross-section is a gently bent S-letter shape.

6. A drum-in-disc brake claimed in claim 1, wherein said dust cover is bent at the inner brim towards said backing plate, leaving a part of said inner brim not bent, and the not-bent portion forms said passage for drainage.

7. A drum-in-disc brake claimed in claim 6, wherein the edge of the not-bent portion of said inner brim is confronted with a gap forming an exit narrower than and perpendicular to said passage for drainage.

8. A drum-in-disc brake claimed in claim 7, wherein said gap is in a caliper retainer for retaining said caliper assembly, said caliper retainer is attached to said backing plate.

* * * * *